No. 878,476. PATENTED FEB. 4, 1908.
I. BARKER.
NUT LOCK.
APPLICATION FILED APR. 20, 1907.
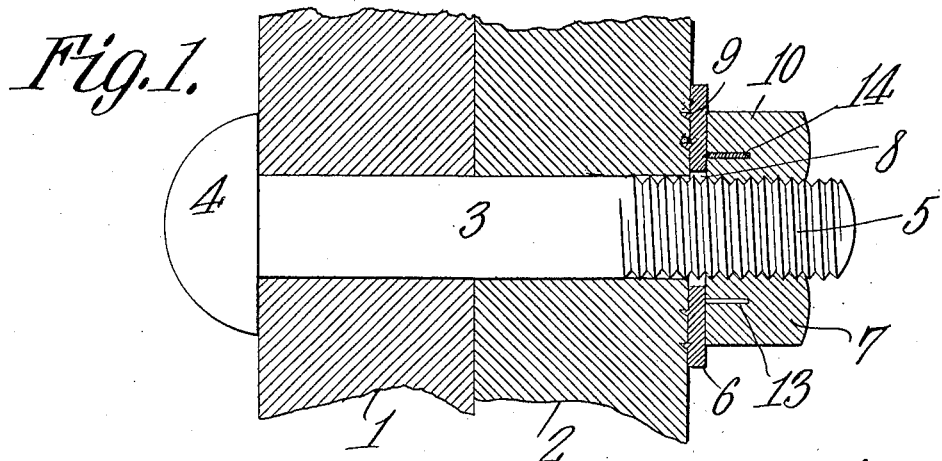
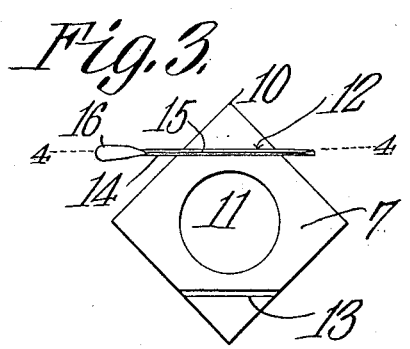
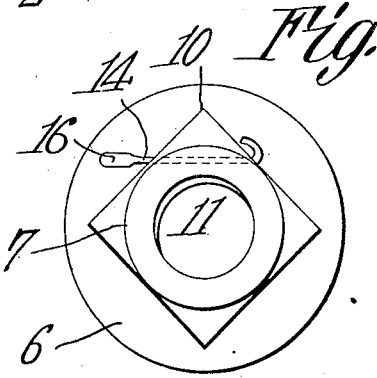
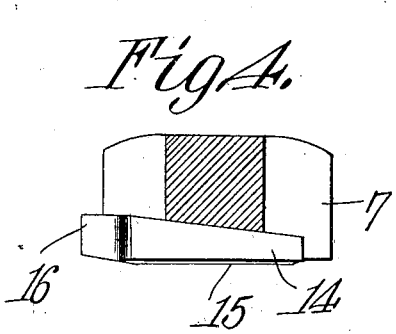
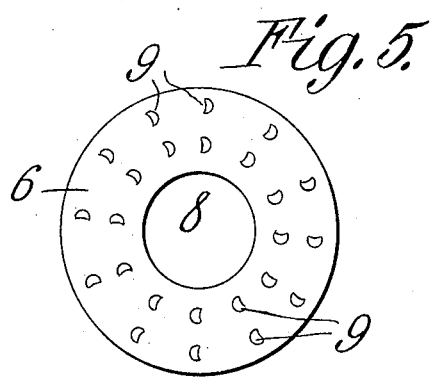
WITNESSES:
Irving Barker,
INVENTOR.
By C. A. Snow & Co.
ATTORNEYS

UNITED STATES PATENT OFFICE.

IRVING BARKER, OF SPRINGFIELD, ILLINOIS, ASSIGNOR OF ONE-HALF TO WILLIAM D. RYAN, OF SPRINGFIELD, ILLINOIS.

NUT-LOCK.

No. 878,476.      Specification of Letters Patent.      Patented Feb. 4, 1908.

Application filed April 20, 1907. Serial No. 369,307.

*To all whom it may concern:*

Be it known that I, IRVING BARKER, a citizen of the United States, residing at Springfield, in the county of Sangamon and State of Illinois, have invented a new and useful Nut-Lock, for and of which the following is a specification.

This invention relates to a nut-lock, the object of which is to provide a key for securing a nut after being firmly screwed to place from becoming loosened by jarring or any other means which would cause a nut to unscrew from a bolt.

Another object of the invention is to provide a washer used in connection with the aforesaid nut with means for preventing it from turning after it has once been seated.

With these and other objects in view the invention consists of the novel construction, combination and arrangement of parts hereinafter described and definitely claimed.

In the accompanying drawings:—Figure 1 is a sectional view illustrating the invention in use. Fig. 2 is an end view of a bolt with nut and washer thereon and the fastening key in place. Fig. 3 is an underside view of the nut and fastening key. Fig. 4 is a sectional view on the line 4—4 of Fig. 3. Fig. 5 is a face view of the under side of the washer.

Similar numerals of reference indicate the same parts in all the figures.

The numerals 1 and 2 indicate two pieces of wood, metal, or other material united by a bolt 3 of ordinary form having in this instance a hemispherical head 4 and a standard thread 5 on the opposite end. The threaded end of the bolt projects beyond the joined pieces 1 and 2, and on said end is placed a washer 6 and a nut 7 which, when screwed tight against the washer, unites the pieces 1 and 2.

The washer 6 is a circular disk having a central hole 8 through which the bolt 3 passes. The underside of the washer is provided with a plurality of circular rows of small, spaced projections or rasp-like teeth 9, case hardened so as to embed themselves into the material of the piece 2, against which it is seated, when the nut 7 is screwed against the washer.

The nut 7 may have as many sides as desired but it is shown in the drawing as a four sided nut, between one corner 10 of which and the threaded central opening 11 is a narrow slot 12 extending across the nut from one side to the other adjacent side. The bottom of this slot is slightly inclined to the face of the nut as shown in Fig. 4. If desired a parallel slot 13 may be made in the nut on the opposite side of the bolt opening 11. A broad thin tapering key 14, adapted to enter the slot, has one of its edges sharply beveled to form a cutting edge 15 and one end thickened laterally to form a head 16 to the key.

In applying the nut lock, after the bolt 3 has been extended through the parts to be clamped, the washer 6 is then placed on the bolt and pushed up as far as it will go; the nut 7 is then screwed on and tightened until the teeth sink into the substance of the piece 2 if it is soft enough, otherwise the washer will be omitted. After the nut has been tightened the key 14 is driven into one of the slots with the knife edge 15 against the washer or the piece 2. The tapering surfaces of the key and bottom of the slot exert a downward pressure on the key, which, combined with the longitudinal movement of the key caused by the driving action, cut into the washer and make a notch for the lower or knife edge of the key which notch prevents the nut from further rotation in either direction. After the key has been seated, its forward end is bent around against the side of the nut and holds the key safely against removal. The width of the key is such that it will pass easily through the slot until its end reaches the opposite side of the nut or passes slightly beyond it before force is necessary so that a sufficient length of the key will project, after being driven tight, to form the bend.

Having thus described the invention what is claimed is:—

1. A nut lock comprising a nut having a narrow slot in its lower face extending entirely across said nut and formed with a tapering bottom, and a thin key with broad sides and tapering edges the lower one of which is a knife-edge, said key slidable in said slot and adapted to be driven into and through it, the knife edge cutting a seat the entire length of the key in the substance against which the nut bears, and the projecting portion of the key bent over on the side of the nut.

2. A nut lock comprising a washer having short teeth on its under side, a nut having a narrow slot in its lower face with a tapering bottom, and a thin tapering key slidable in said slot having a knife edge and thickened at one end, said key adapted to be driven through said slot cutting a seat for itself in said washer and having a projecting end.

In testimony that I claim the foregoing as my own, I have hereto affixed my signature in the presence of two witnesses.

IRVING BARKER.

Witnesses:
SAMUEL H. GEHLMAN,
CHARLES E. GEHLMAN.